United States Patent

Fischer

Patent Number: 4,475,041
Date of Patent: Oct. 2, 1984

[54] APERTURE DEVICE FOR MEASURING THIN FILMS

[76] Inventor: Helmut Fischer, 7261 Gechingen, Fed. Rep. of Germany

[21] Appl. No.: 380,524

[22] Filed: May 21, 1982

[30] Foreign Application Priority Data

Nov. 6, 1981 [DE] Fed. Rep. of Germany ....... 3144145

[51] Int. Cl.³ ..................... G01N 23/225; G21K 1/02
[52] U.S. Cl. ................................. 250/358.1; 250/308; 250/393
[58] Field of Search .................. 250/358.1, 393, 496.1, 250/308

[56] References Cited

U.S. PATENT DOCUMENTS

| | | | |
|---|---|---|---|
| 3,319,067 | 5/1967 | Joffe et al. | 250/308 |
| 3,705,305 | 12/1972 | Fischer | 250/358.1 |
| 3,714,436 | 1/1973 | Fischer | 250/308 |
| 4,317,997 | 3/1982 | Tiebor et al. | 250/308 |
| 4,406,948 | 9/1983 | Fischer et al. | 250/308 |

Primary Examiner—Janice A. Howell
Assistant Examiner—Constantine Hannaher

[57] ABSTRACT

An aperture device for measuring thin films has an aperture ring, of a material and thickness that is impenetrable by the radiation from radionuclides. The ring has a passage for emitted and reflected radiation extending approximately perpendicular to said ring, and a radiation device consisting of at least one collimating radiation source holder comprising a tube of a predetermined diameter that is permeable to radiation in the forward direction and has sides and a back that are impermeable to radiation and houses a radionuclide. The forward end surface of the tube lies behind the forward end surface of the passage. The cross-section of the passage is large compared to the cross-section of the radionuclide. A partition divides the passage into at least two chambers that are open at their rearward and forward ends. The partition has partition walls that are impermeable to radiation. The radiation source holder is arranged in one of the chambers, the cross-section of which chamber is a multiple of the cross-section of the radiation source holder. The forward end surface of the radiation source holder lies behind the forward end surface of the partition.

21 Claims, 13 Drawing Figures

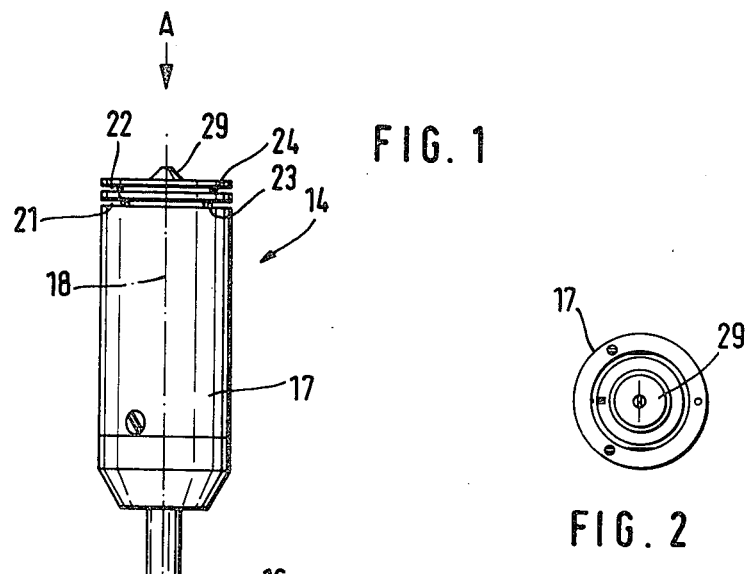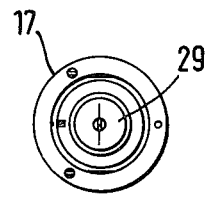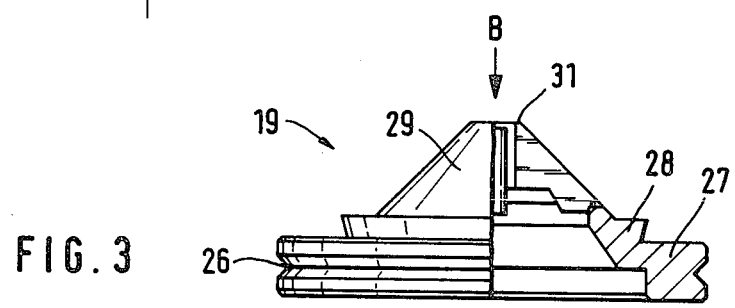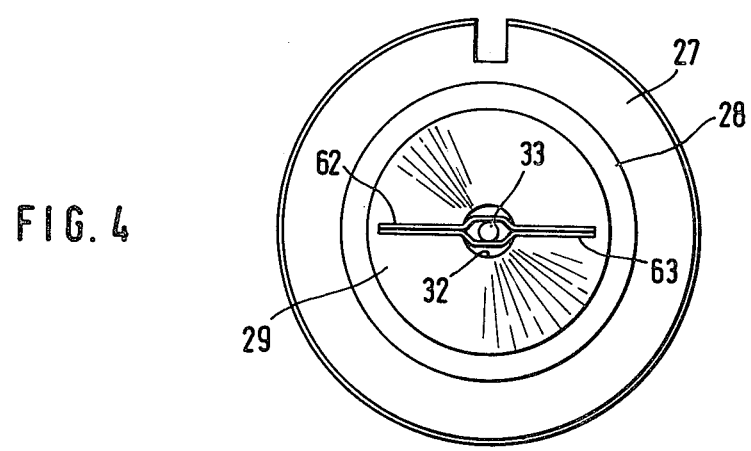

APERTURE DEVICE FOR MEASURING THIN FILMS

This invention relates to an aperture device for measuring thin films, having an aperture ring that is impenetrable by the radiation from radionuclides. The device includes an aperture ring with a perpendicular passage for emitted and reflected radiation and a tubular holder that houses a radionuclide that is permeable to radiation in the forward direction.

BACKGROUND OF THE INVENTION

In use, one for example places a contact stud provided with a gold layer on the aperture device in order to measure the thickness of the layer of gold. The thicknesses of the films falls in the micrometric region. In order to be able to obtain accurate and reproducible measurement results it is necessary to position the parts very exactly on the aperture. The size of the passage in the case of small apertures amounts to 4/10 mm. If the part to be measured wobbles or if it becomes displaced by even a few micrometers, then the measured value automatically changes by about 30%.

The change in the spacing of the part from the surface on which it is lying on the aperture gets included in the measurement.

Obviously, changes in spacing cannot essentially be avoided when the product to be measured is not—as in the above case—non-moving with respect to the aperture but rather is a product under measurement which is being moved. On account of unavoidable changes in the thickness of the product being measured and because of the values corresponding to the extent of shaking in the case of products which are being moved, measurement is very difficult.

OBJECTS AND STATEMENT OF THE INVENTION

The aim of the invention is to provide a device of the type stated above, in which changes in the spacing of the product being measured with respect to the aperture within a certain range of changes do not enter into the measurement result or only do so to an unsignificant extent. This aim can be considered as having been achieved when it is possible to tolerate changes in the spacing lying in the region of from 0.1 to 0.3 mm.

In accordance with the invention, this aim is achieved by the improvement in which
 (a) the cross-section of the passage is large compared to the cross-section of the radionuclide,
 (b) partition means divide the passage into at least two chambers that are open at their rearward and forward ends, the partition means having partition walls that are impermeable to radiation,
 (c) the radiation source holder is arranged in one of the chambers, the cross-section of which chamber is a multiple of the cross-section of the radiation source holder, and
 (d) the forward end surface of the radiation source holder lies behind the forward end surface of the partition means.

Advantageously, the invention includes the following additional features.

The source holder comprises a tube of a predetermined diameter that is permeable to radiation in the forward direction.

The cross-section of the passage is between 100 and 10 times larger than the cross-section of the radionuclide.

The cross-section of the passage is between 90 and 20 times larger than the cross-section of the radionuclide.

The cross-section of the passage is between 80 and 30 times larger than the cross-section of the radionuclide.

The cross-section of the passage is between 70 and 40 times larger than the cross-section of the radionuclide.

The cross-section of the passage is between 60 and 50 times larger than the cross-section of the radionuclide.

The passage is circular.

The passage is in the form of an elongated rectangle.

The passage contains the radionuclide at its centroid.

The chambers essentially have simple geometrical cross-sections.

The chambers essentially have geometrical cross-sections selected from circles, portions of circles, parallelograms, and rectangles.

An area of the partition wall of the chamber receiving the tube constitutes the holding means for the tube.

The tube lies between two parallel partition walls.

The partition walls run parallel to the axis of the tube.

The partition walls are approximately as deep as the length of the tube.

The cross-sectional area of the partition walls is small compared to the cross-sectional area of the passage.

The tube is arranged essentially co-axially in the passage.

The forward end surface of the tube lies between about 0.2 and 0.7 mm behind the forward end surface of the partition.

The characteristic cross-sectional dimension of the chambers lie in the region of about one millimeter.

The radiation device has two tubes that are commonly arranged in one chamber, which radiate towards the longitudinal axis on the device, making an acute angle therewith.

The invention will now be described with reference to a preferred embodiment of it. The drawings provide figures in which in order to ascertain the measurements, the tube diameter should be taken as being 0.7 mm.

DESCRIPTION OF THE DRAWINGS

The drawings show:
FIG. 1: a side view of a probe,
FIG. 2: a view in the direction of arrow A in FIG. 1,
 FIG. 3: a partial cross-section through the aperture device,
FIG. 4: a view in the direction of arrow B in FIG. 3,
 FIG. 5: a view in the direction of arrow B in FIG. 3 of the passage and the parts contained therein.

DETAILED DESCRIPTION

Figure 5:
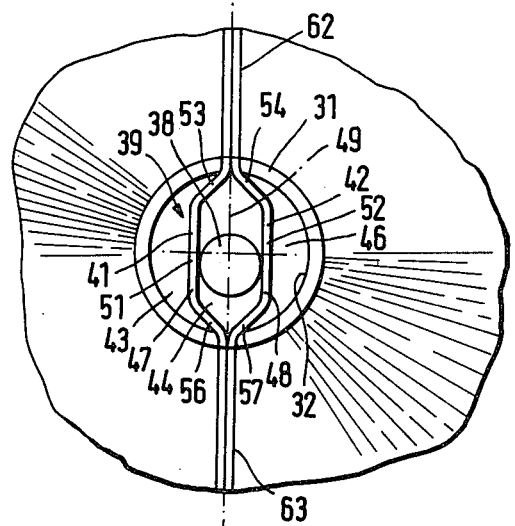

A probe 14 includes a connecting cable 16 for voltage supply and for taking off the signal impulses of a conventional GM counting tube which, in the conventional fashion is provided in the metal cylindrical housing 17 coaxially to a geometric longitudinal axis. In order to retain the aperture device 19 of FIGS. 3 and 5, peripheral grooves 21, 22 are formed in the housing 17 in the conventional fashion, and snap rings 23, 24 are inserted into these. A partial region of the snap ring 23 passes through the inner surface of the housing 17 and engages in the V-shaped groove 26 in the base ring 27.

As can be seen in FIGS. 3 and 4, the aperture device 19 has, in the conventional fashion, a base ring 27 on to which a step ring 28 is built, a frusto-conical part 29 following this and being integral therewith, the upper end of the frusto-conical part 29 having a circular end face 31. The construction however differs from constructions known to date as a result of the fact that the circular passage 32 is, in diameter, about three times as large as the tube 33 which is of conventional construction, which in the case of ideal assembly, is coaxial to the longitudinal axis 18, having a through passage 34, the rear part of the through passage 34 being blocked off to radiation by means of insulating material 36, it carrying a small sphere 37 of a radionuclide which for example can consist of promethium 137 or ruthenium 106. At the forward end, the tube 33 is closed off by means of a radiation permeable membrane 38 so that the usual collimated radiation beam can pass through to the outside.

A partition 39 in a metal which is not permeable to radiation is provided in the passage 32. The partition 39 consits of two partition walls 41, 42, in such an arrangement that three chambers 43, 44, 46 are produced. The partition walls 41, 42 run parallel to the longitudinal axis 18, so that in the view shown in FIG. 5, it is only possible to see their forward end surfaces 47, 48. The chamber 43 is of the same size as the chamber 46, both as regards their cross-sectional area as well as their geometrical shaping. They have, in the example of one embodiment, a roughly quarter moon shape. As is shown in FIG. 5, the chamber 44 has, in cross-section, the approximate shape of two parallelograms which are in contact at their base surfaces.

The partition walls 41, 42 are centrically symmetric to the geometrical longitudinal axis 18 as well as being symmetric to a radial plane 49 passing through this longitudinal axis 18. The middle wall regions 51, 52 are straight and change over at both their ends to essentially shorter wall regions 53, 54, 55, 57 which run towards each other.

As a departure from the conventional idealized fashion of drawing, FIG. 5 shows the shape of an actual embodiment, from which, amongst other things, it can be seen that it is not absolutely essential for the tube 33 to be exactly coaxial with the longitudinal axis 18. Additionally, the partition walls 41, 42 do not need to have any idealized geometrical shape. As is shown particularly clearly in FIG. 6, the end surface 31 is flush in the radial sense with the end surfaces 47, 48. Nevertheless the tube 33 and consequently the radionuclide 37 are displaced inwardly by an amount of about 1 tube diameter or 0.7 mm from this plane of the end surfaces 31, 47, 48. The tube 33 is clamped between the wall regions 51, 52 and uses these walls to hold it in position. It can consequently easily be adjusted in its axial position and in its position in the radial plane as well and is thus effectively held in position and well protected. In order to provide for final attachment, the tube 33 is firmly bonded by means of an adhesive 58 to the inner side of the mid wall region 51, 52.

Figure 7:
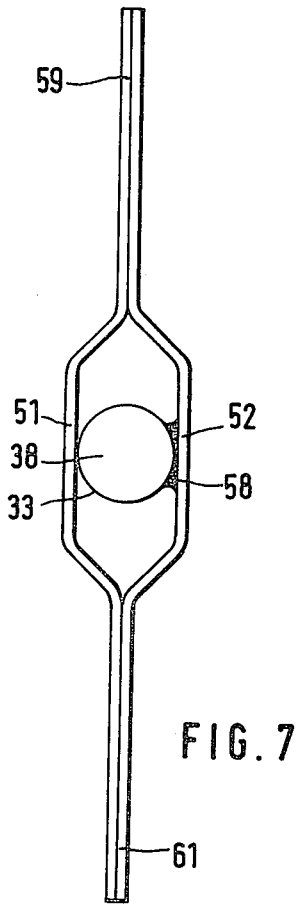
FIG. 7: a view in the direction of arrow C in FIG. 6,
 FIG. 8: a view similar to that in FIG. 5 of an alternative embodiment.
Figure 6:
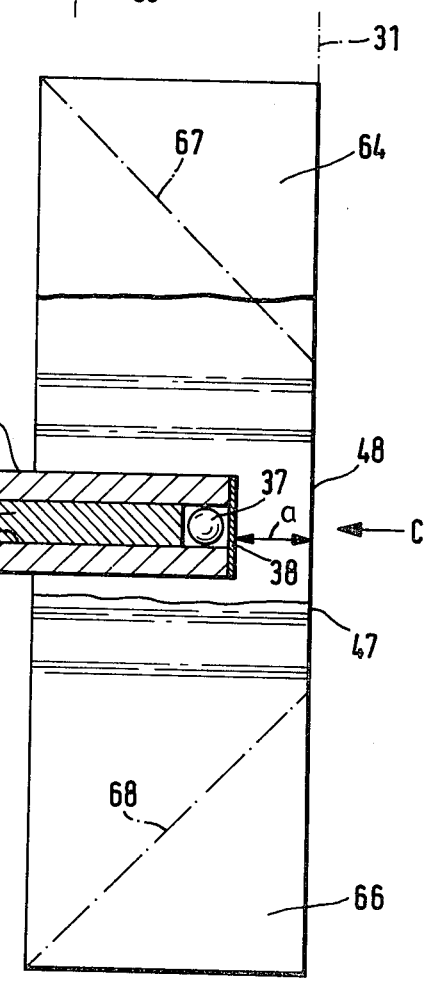
FIG. 6: an axial section of the tube together with a partition wall, prior to assembly.

At assembly, the partition walls 41, 42 have the shaping which can be seen in FIGS. 6 and 7. Their outer wings 59, 61 are intimately joined together. In this form they are inserted into a radial slit 62, 63 in the truncated cone 39 and are fixed in position there. Following this, the partial regions 64, 66 which project from the truncated cone 29 are removed so that the lines which are shows dashed from FIG. 6 coincide with the outer contour of the truncated cone 29.

Figure 13:
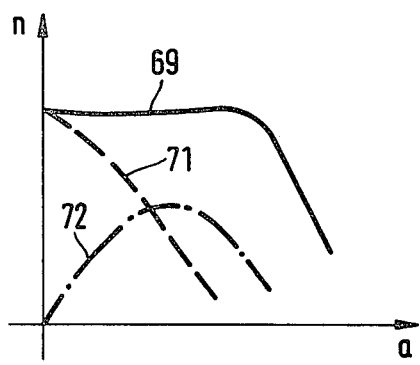
FIG. 13: a plot of count rate against spacing, obtainable using the arrangement in accordance with FIGS. 1 to 7.

As shown in FIG. 6, the plane of the circular end face 31 of the aperture is spaced from the plane of the permeable membrane 38 by a spacing "a". If one plots the spacing a on one axis against the count rate n on the other axis as shown in FIG. 13, then, over a region of from 0.1 to 0.3 mm a plateau 69 is obtained, which essentially runs parallel to the a-axis and only starts to fall off after this. This means that in this region, the count rate n is almost completely independent of the spacing. 0.1 to 0.3 mm, in present-day practice, are coarse mechanical measurements.

Although the explanation which follows does not of necessity need to be correct, the inventor is of the opinion that this plateau 69 is attained as a result of the super-imposition of two curves 71, 72. Curve 71 relates to the portion scattered back through the inner chamber 44 when the layer to be measured is lying directly on the end surfaces 31, 47, 48. This portion, in accordance with the curve 71, becomes smaller as the spacing increases. To the same extent as the latter falls, the proportion of back scattering through the chambers 43, 46 now grows as the spacing increases, as can be seen from the curve 72.

Figure 8:
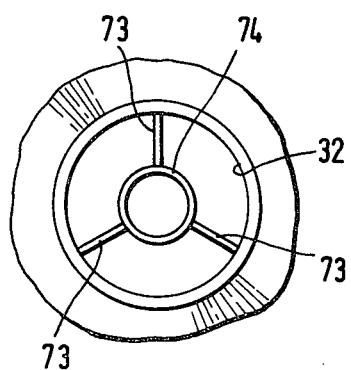

In accordance with FIG. 8, it is not essential for the shaping of the chamber to be that of a quarter moon—double rhombic/quarter moon configuration. It may equally as well have walls 73 which run radially. In the present case the walls 73 are staggered by 120° so that three walls 73 exist. It is equally possible to simply use two walls 73 which are offset by 180°. These then meet up with an inner cylinder 74. The walls 73 as well as the cylinder 74 run parallel to the longitudinal axis 18. In this case, a tube 33 would be held in position so as to be offset inwardly—as shown in FIG. 6—and concentric with the cylinder 74. In the embodiment shown in FIG. 8 one inner chamber and three outer chambers are produced.

Figure 9:
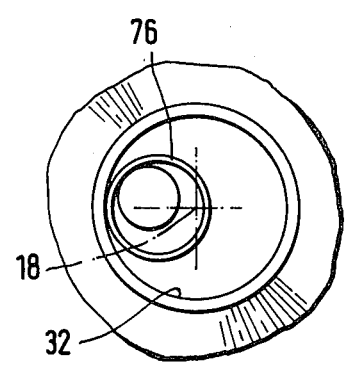
FIG. 9: a view similar to FIG. 5 of a third embodiment.

Whilst the examples of embodiments described heretofore exhibit double symmetry. FIG. 9 shows that other distributions are also possible. Here, within the passage 32, a cylindrical partition wall 76 is provided which is parallel to but no coaxial with the longitudinal axis 18. The partition wall 76 is attached along a line of its outer contour to an inner surface of the passage 32. The tube 33 can in this case be retained so as to be coaxial to a cylindrical partition wall 76, e.g. using a radiating arm arrangement. Alternatively, the tube 33 can be provided off-center on the inner wall of the partition wall 76. In this case, from the qualitative aspect, the curve 71 would correspond to that portion of radiation reflected back to the GM tube through the space surrounded by the partition wall 76. If the tube 33 is attached to the outer side of the partition wall 76, then the curve 72, from the qualitative aspect, would correspond to that portion reflected back through the volume surrounded by the partition wall 76.

Figure 10:
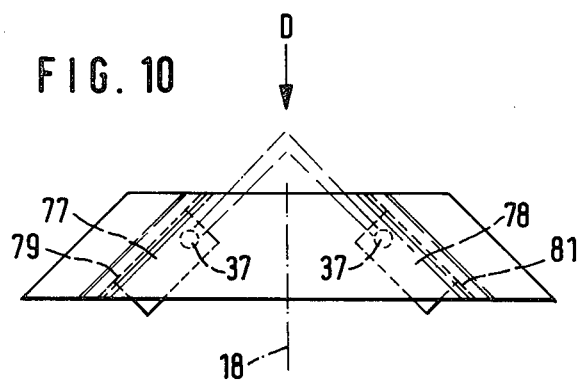
FIG. 10: a view similar to that in FIG. 6, but with two tubes inclined towards each other.
Figure 11:
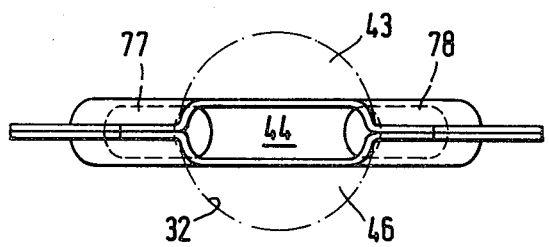
FIG. 11: a view in the direction of arrow D in FIG. 10,
 FIG. 12: a view similar to that given in FIG. 5, but for a surface radiator.

A fourth embodiment in accordance with FIGS. 10 and 11 shows that it is also possible to employ two tubes 72, 78 in the middle chamber 44. The tubes 77, 78 are here inclined towards the mid axis 18 at an angle of 45°. Corresponding to this inclination, here the intersections where the outer wings 59, 61 meet each other are not parallel to the longitudinal axis. The case rather is that these intersections 79, 81 also run at an angle of 45° to the longitudinal axis 18. The tubes, 77, 78 lie in the recess thus formed. In the same way as with the case above, three chambers 43, 44, 46 are provided.

When calculating the geometry—resulting from what has been said above—care should be taken to ensure that the decreasing amount of radiation as the spacing a increases and the increasing portion of radiation as the spacing increases exactly compensate each other as a result of the various chamber volumes, so that a plateau 69 is obtained.

Figure 12:
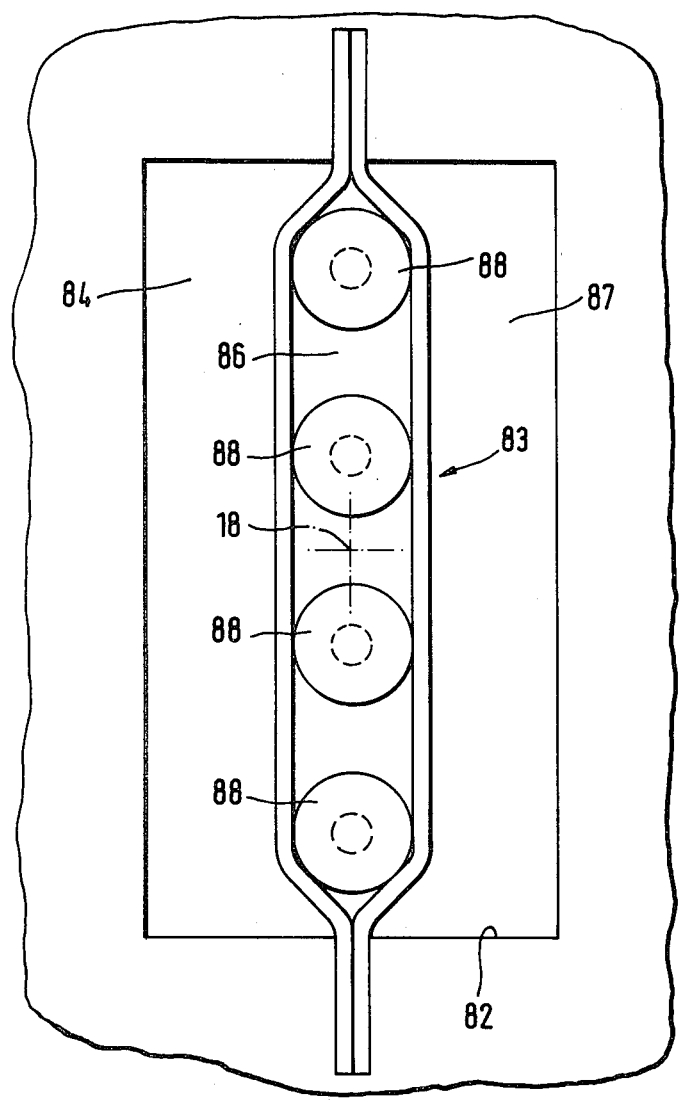

In the last embodiment in accordance with FIG. 12, the passage 82 is of rectangular shape. Its longitudinal sides are longer than its transverse sides. In the passage 82, a partition 83 is once again provided, so that chambers 84, 86, 87 result, similar to the chambers 43, 44, 46. In the chamber 86, several tubes 88 which are parallel to the longitudinal axis 18 are provided. The tubes 88 must have a spacing from each other such that a plot in accordance with the curve 71 can in fact actually be achieved.

The drawings have not shown that a radiation-permeable foil is located on the outer end surfaces 31, 47, 48, which protect the inside of the probe against dirt etc. Such a protective layer provided by this foil has, in this invention, been made possible in practice for the first time.

I claim:

1. In an aperture device for measuring thin films, having
   an aperture ring, of a material and thickness that is impenetrable by the radiation from radionuclides, said ring having a passage for emitted and reflected radiation extending approximately perpendicular to said ring,
   a radiation device consisting of at least one collimating radiation source holder having sides and a back that are impermeable to radiation and houses a radionuclide,
   the forward end surface of said source holder lying behind the forward end surface of said passage, the improvement in which
   (a) the cross-section of said passage is large compared to the cross-section of said radionuclide,
   (b) partition means divide said passage into at least two chambers that are open at their rearward and forward ends, said partition means having partition walls that are impermeable to radiation,
   (c) said radiation source holder is arranged in one of said chambers, the cross-section of which chamber is a multiple of the cross-section of said radiation source holder, and
   (d) said forward end surface of said radiation source holder lies behind the forward end surface of said partition means.

2. An aperture device in accordance with claim 1 in which said source holder comprises a tube of a predetermined diameter that is permeable to radiation in the forward direction.

3. An aperture device in accordance with claim 1, in which the cross-section of said passage is between 100 and 10 times larger than the cross-section of said radionuclide.

4. An aperture device in accordance with claim 1, in which the cross-section of said passage is between 90 and 20 times larger than the cross-section of said radionuclide.

5. An aperture device in accordance with claim 1, in which the cross-section of said passage is between 80 and 30 times larger than the cross-section of said radionuclide.

6. An aperture device in accordance with claim 1, in which the cross-section of said passage is between 70 and 40 times larger than the cross-section of said radionuclide.

7. An aperture device in accordance with claim 1, in which the cross-section of said passage is between 60 and 50 times larger than the cross-section of said radionuclide.

8. An aperture device in accordance with claim 1 in which said passage is circular.

9. An aperture device in accordance with claim 1 in which said passage is in the form of an elongated rectangle.

10. An aperture device in accordance with claim 1 in which said passage contains said radionuclide at its centroid.

11. An aperture device in accordance with claim 1 in which said chambers essentially have simple geometrical cross-sections.

12. An aperture device in accordance with claim 1 in which said chambers essentially have geometrical cross-sections selected from circles, portions of circles, parallelograms, and rectangles.

13. An aperture device in accordance with claim 2 in which an area of the partition wall of said chamber receiving said tube constitutes the holding means for said tube.

14. An aperture device in accordance with claim 13, in which said tube lies between two parallel partition walls.

15. An aperture device in accordance with claim 2, in which said partition walls run parallel to the axis of said tube.

16. An aperture device in accordance with claim 2, in which said partition walls are approximately as deep as the length of said tube.

17. An aperture device in accordance with claim 2, in which the cross-sectional area of said partition walls is small compared to the cross-sectional area of said passage.

18. An aperture device in accordance with claim 2, in which said tube is arranged essentially co-axially in said passage.

19. An aperture device in accordance with claim 2, in which said forward end surface of said tube lies between about 0.2 and 0.7 mm behind said forward end surface of the partition.

20. An aperture device in accordance with claim 2, in which the characteristic cross-sectional dimension of said chambers lie in the region of about one millimeter.

21. An aperture device in accordance with claim 2 in which said radiation device has two tubes that are commonly arranged in one chamber, which radiate towards the longitudinal axis on the device, making an acute angle therewith.

* * * * *